(12) United States Patent
Hall et al.

(10) Patent No.: US 7,451,310 B2
(45) Date of Patent: Nov. 11, 2008

(54) PARALLELIZABLE AUTHENTICATION TREE FOR RANDOM ACCESS STORAGE

(75) Inventors: William E. Hall, Clinton, CT (US); Charanjit S. Jutla, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 10/307,673

(22) Filed: Dec. 2, 2002

(65) Prior Publication Data

US 2004/0107341 A1    Jun. 3, 2004

(51) Int. Cl.
*H04L 9/00* (2006.01)
(52) U.S. Cl. .......................................... 713/161; 726/2
(58) Field of Classification Search .................. 713/1, 713/2, 188, 194, 161; 380/200, 201, 255, 380/277; 726/2
See application file for complete search history.

(56) References Cited

U.S. PATENT DOCUMENTS

| | | | | |
|---|---|---|---|---|
| 4,309,569 | A | * | 1/1982 | Merkle ........................ 713/177 |
| 5,231,666 | A | * | 7/1993 | Matyas ......................... 705/75 |
| 5,276,872 | A | * | 1/1994 | Lomet et al. ................. 707/202 |
| 5,826,254 | A | * | 10/1998 | Kahn ............................. 707/5 |
| 6,009,176 | A | * | 12/1999 | Gennaro et al. ............. 713/170 |
| 6,065,008 | A | * | 5/2000 | Simon et al. .................. 707/10 |
| 6,097,811 | A | * | 8/2000 | Micali ........................ 713/186 |

(Continued)

*Primary Examiner*—Kimyen Vu
*Assistant Examiner*—Joseph Pan
(74) *Attorney, Agent, or Firm*—F.Chau & Associates, LLC

(57) ABSTRACT

This invention relates to a method and apparatus for generating a cryptographic authentication code of a set of plaintext blocks, while allowing incremental updates to the set of plaintext blocks. Additionally, an aspect of the invention, allows the updated authentication code to be computed in a highly parallelizable manner.

Another embodiment of the present invention defines a new class of authentication trees in which the updated authentication tree, although requiring log(n) block cryptographic operations, allows for the log(n) block cryptographic operations to be computed in parallel.

Another embodiment of the present invention provides encryption and verification authentication tree schemes, as well as, an apparatus that generates, updates, and verifies such authentication trees.

Another embodiment of the present invention provides authentication tree schemes in which the individual cryptographic operations are block cipher invocations as opposed to hash function invocations.

A method according to an embodiment of the present invention, for implementing a parallelizable authentication tree is provided within the application. The method comprises the steps of recursively initializing an authentication tree to include nodes, inputting plaintext blocks into an authentication tree modifier, inputting the initialized authentification tree into the authentification tree modifier, processing the plaintext blocks and the initialized authentication tree by the authentication tree modifier, and outputting a modified authentication tree from the authentication tree modifier. tree modifier, inputting the initialized authentication tree into the authentication tree modifier, processing the plaintext blocks and the initialized authentication tree by the authentication tree modifier, and outputting a modified authentication tree from the authentication tree modifier.

57 Claims, 9 Drawing Sheets

U.S. PATENT DOCUMENTS

| | | | |
|---|---|---|---|
| 6,226,743 B1 * | 5/2001 | Naor et al. | 713/177 |
| 6,237,096 B1 * | 5/2001 | Bisbee et al. | 713/178 |
| 6,618,737 B2 * | 9/2003 | Aridor et al. | 707/205 |
| 6,874,006 B1 * | 3/2005 | Fu et al. | 708/442 |
| 7,013,389 B1 * | 3/2006 | Srivastava et al. | 713/163 |
| 7,058,819 B2 * | 6/2006 | Okaue | 713/193 |
| 7,200,684 B1 * | 4/2007 | Schales et al. | 709/252 |
| 2001/0034839 A1 * | 10/2001 | Karjoth et al. | 713/190 |
| 2003/0093613 A1 * | 5/2003 | Sherman | 711/104 |
| 2003/0185396 A1 * | 10/2003 | Asano et al. | 380/277 |

* cited by examiner

PARALLELIZABLE AUTHENTICATION TREE FOR RANDOM ACCESS STORAGE

FIELD OF THE INVENTION

This invention relates to a method for generating a cryptographic authentication code, more specifically, a method and device which allows the updated authentication code to be computed in a highly parallelizable manner.

BACKGROUND OF THE INVENTION

Cryptographic systems are known in the data processing art. In general, these systems operate by performing an encryption operation on a plaintext input message, using an encryption key and a symmetric key block cipher, producing a cipher-text message. The encrypted message may then be sent over an unreliable and unsecured channel to a receiver that shares the secret key. The receiver of the encrypted message performs a corresponding decryption operation using the same key, to recover the plaintext message. Since the same key is used by both the sender and receiver of the message, the process is referred to as a "symmetric key" process.

In current cryptographic systems, message integrity is controlled using a message authentication code ("MAC"). This is necessary since although the receiver of the ciphertext message can decrypt the ciphertext, the receiver is not assured that the ciphertext was not accidentally or maliciously altered during the ciphertext transmission. Message integrity is thereby ensured by transmitting the ciphertext message with a MAC.

In some applications the data is not encrypted. The two users that are exchanging messages and data, are only interested in authenticating the data. That is, only a MAC is generated on the plaintext, and sent with the plaintext, assuring the receiver that the plaintext being sent is indeed authentic.

In applications concerning data storage, there is actually only one user. For example, a user may want to store data in an unsecured device and later check to determine if the data was not deliberately or accidentally modified. Since the MAC is comparatively a small piece of data relative to the data stored, to prevent stored data modification, the user will store the data and save the MAC in a secure location. When retrieving the data at a later time, the user would regenerate the MAC on the retrieved data, and compare it with the original MAC for authenticity.

There are further situations, in which the data as stored above, or communicated to another user, is updated in an incremental manner. With the exception of a single block, the majority of the data remains the same. It would be prohibitive to recompute the entire MAC each time a block of data is updated. In such a situation, an authentication tree is generated instead of a simple MAC. This type of authentication tree is well known in the art and is referred to as a Merkle Authentication tree.

However, for a total data of n blocks, which can be updated on a block by block basis, the Merkle Authentication tree requires a computation of log(n) block cryptographic operations. Moreover, these log(n) cryptographic operations are inherently sequential and are not abled to be pipelined. That is, the first operation has to finish completely before the second operation can begin.

What is needed is a new class of authentication tree that allows for the log(n) block cryptographic operations to be computed in parallel.

SUMMARY OF THE INVENTION

An embodiment of the present invention defines a new class of authentication trees in which the updated authentication tree, although requiring log(n) block cryptographic operations, allows for the log(n) block cryptographic operations to be computed in parallel.

Another embodiment of the present invention provides encryption and verification authentication tree schemes, as well as, an apparatus that generates, updates, and verifies such authentication trees.

Another embodiment of the present invention provides authentication tree schemes in which the individual cryptographic operations are block cipher invocations as opposed to hash function invocations.

A method according to an embodiment of the present invention is provided for implementing a parallelizable authentication tree. The method comprises the steps of recursively initializing an authentication tree to include nodes, inputting plaintext blocks into an authentication tree modifier, inputting the initialized authentication tree into the authentication tree modifier, processing the plaintext blocks and the initialized authentication tree by the authentication tree modifier, and outputting a modified authentication tree from the authentication tree modifier.

A program storage device readable by machine, tangibly embodying a program of instructions executable by the machine is provided to perform method steps according to an embodiment of the present invention for implementing a parallelizable authentication tree. The method steps comprise, recursively initializing an authentication tree to include nodes, inputting at least one of a plurality of plain text blocks into an authentication tree modifier, inputting the initialized authentication tree into the authentication tree modifier, processing the plaintext blocks and the initialized authentication tree by the authentication tree modifier, and outputting a modified authentication tree from the authentication tree modifier.

These and other embodiments of the present invention will become apparent from the following detailed description of illustrative embodiments thereof, which is to be read in connection with the accompanying drawings.

DETAILED DESCRIPTION OF PREFERRED EMBODIMENTS

Embodiments of the present invention will be described and are attained with encryption/decryption methods of block ciphers and a program storage device embodying a program of instructions executable by a machine to perform embodiments of methods according to the present invention.

A method according to an embodiment of the present invention comprises the step of generating an initial authentication tree using two secret keys. For each update of data, which comprises a change in one of the blocks of the data, an initial authentication tree is modified to create an updated authentication tree.

Figure 1:
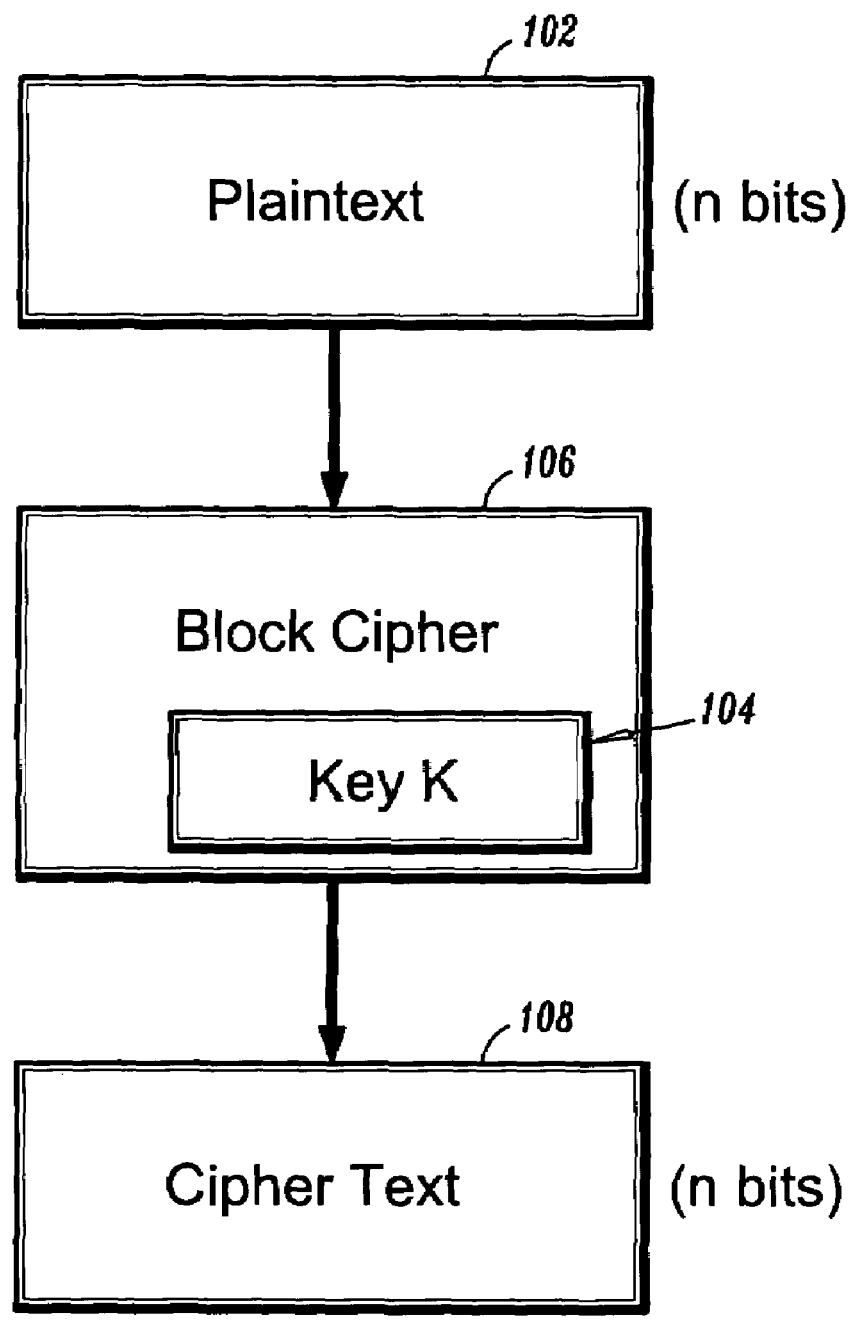
FIG. 1 is an illustration of a prior art cryptographic method that operates on a plaintext message.

FIG. 1 is illustrative of the prior art of cryptographic systems. A block cipher algorithm 106, for example, Digital Encryption Standard ("DES") or Advanced Encryption Standard ("AES"), is used to encrypt one block of plaintext to generate one block of ciphertext. The block size is fixed at 64 bits or 128 bits in DES and AES. The block cipher uses a secret key K (104). The secret key K (104) is shared between the encrypting and decrypting users. To recreate the original plaintext block, the decrypting user uses the same key and the same block cipher to decrypt the ciphertext 108 that was used to encrypt the original plaintext block.

Figure 2:
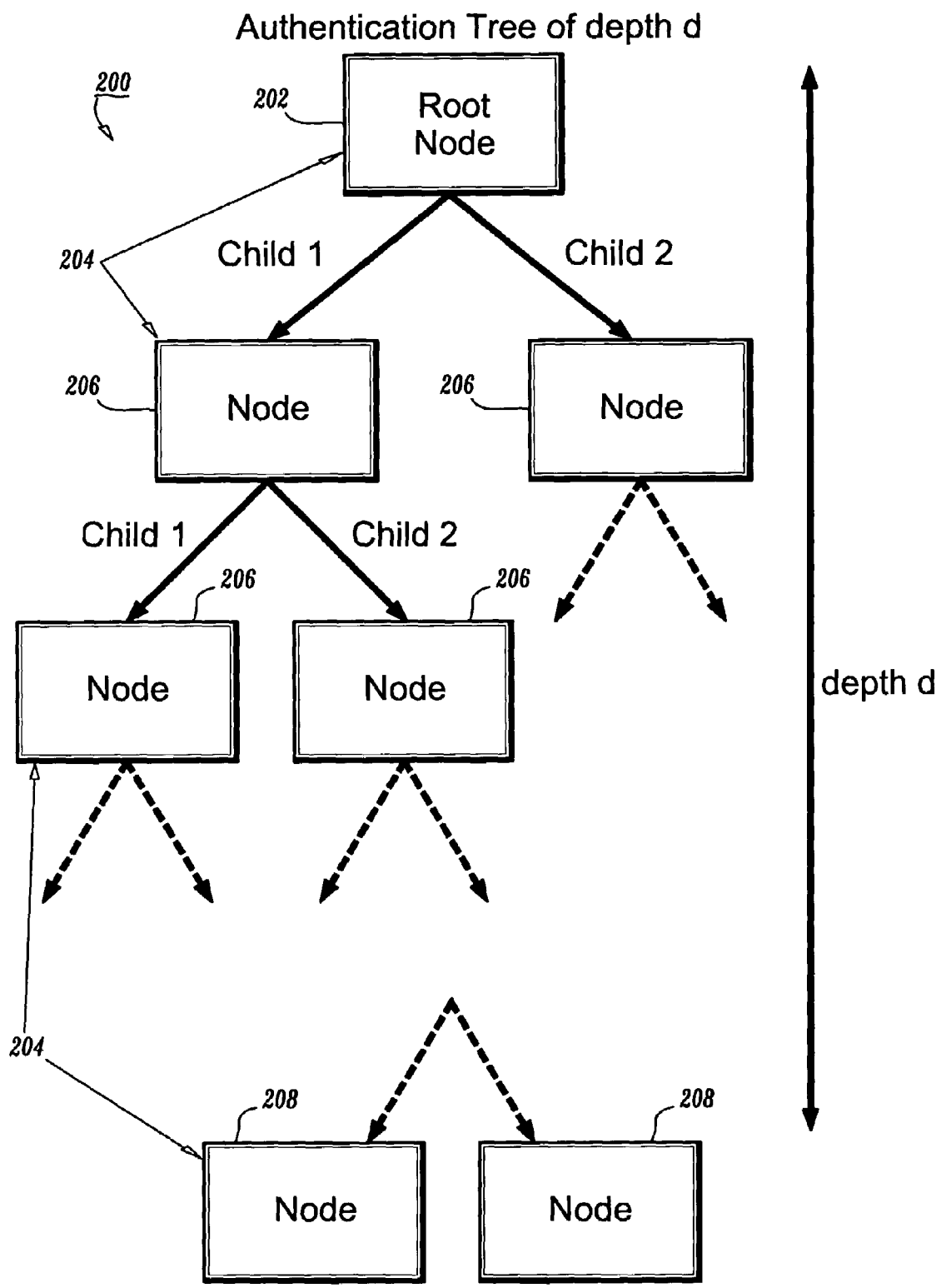
FIG. 2 is a block diagram of an authentication tree of depth d according to the present invention.

FIG. 2 illustrates an embodiment of the present invention depicting an authentication tree 200 that is a data structure. The data structure has a size of n blocks, and will have a depth of log(n). The depth represents the number of layers in the authentication tree 200. The authentication tree has components called nodes 202-208. Each node has its own data structure, alternatively known as attributes. The attributes can be pointers that link the nodes to each other. The attributes of all nodes are identical, however, some of the node attributes can have an empty or null value. The node attributes are described in greater detail with reference to FIG. 2a.

The authentication tree 200 has a root node 202 and one or more child nodes 204. The child nodes 204 are designated as either, an internal node 206 or a leaf node 208. Internal nodes are nodes that are not on the bottom layer of the authentication tree 200. Leaf nodes are nodes that are on the bottom layer of the authentication tree 200. One internal node is designated as the root node 202.

In an alternate embodiment of the present invention, each node (204) of the authentication tree, except the leaf nodes 208, can have two child nodes.

As illustrated in FIG. 2, each node has one or more child nodes. Following the pointers from node to node establishes a path from the root node to a leaf node. These paths are important in that when a leaf node is updated all nodes that are on its path beginning with the root node are updated.

A neighboring path is defined as all nodes that are child nodes in a given path excluding the nodes that comprise the path. The nodes to be updated in the neighboring path and the path are also collectively known as an updated set of nodes.

Figure 2A:
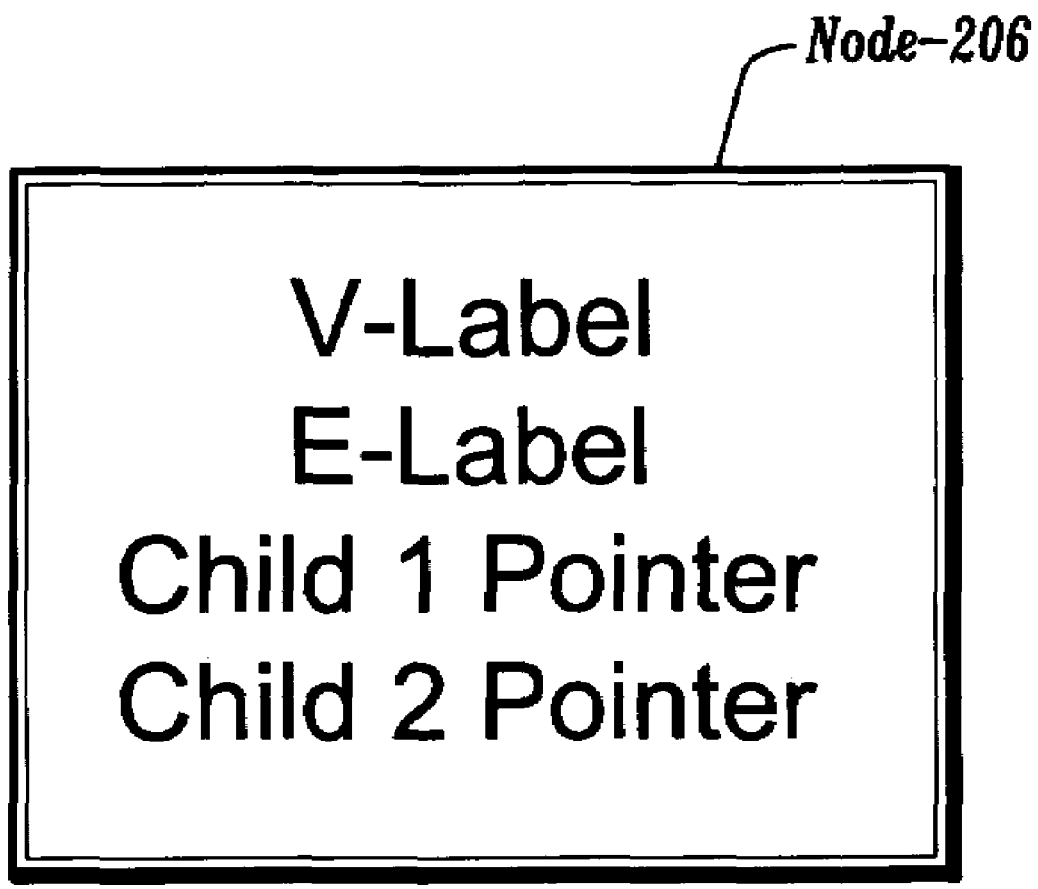
FIG. 2a is a block diagram of a node of an authentication tree of depth d according to the present invention.

FIG. 2a illustrates the attributes that each node of the authentication tree of FIG. 2 can have. Each node can have two labels, or entries called V-label and E-label, as well as, a child-1 node pointer and a child-2 node pointer. Each node that has child node pointers is the parent node of any child node, that the child node pointers link to. The labels and the child node pointers are used in the authentication tree initialization process and the authentication tree modification process that are described in detail below. In another embodiment according to the present invention, each node can have more than two child node pointers.

Figure 3:
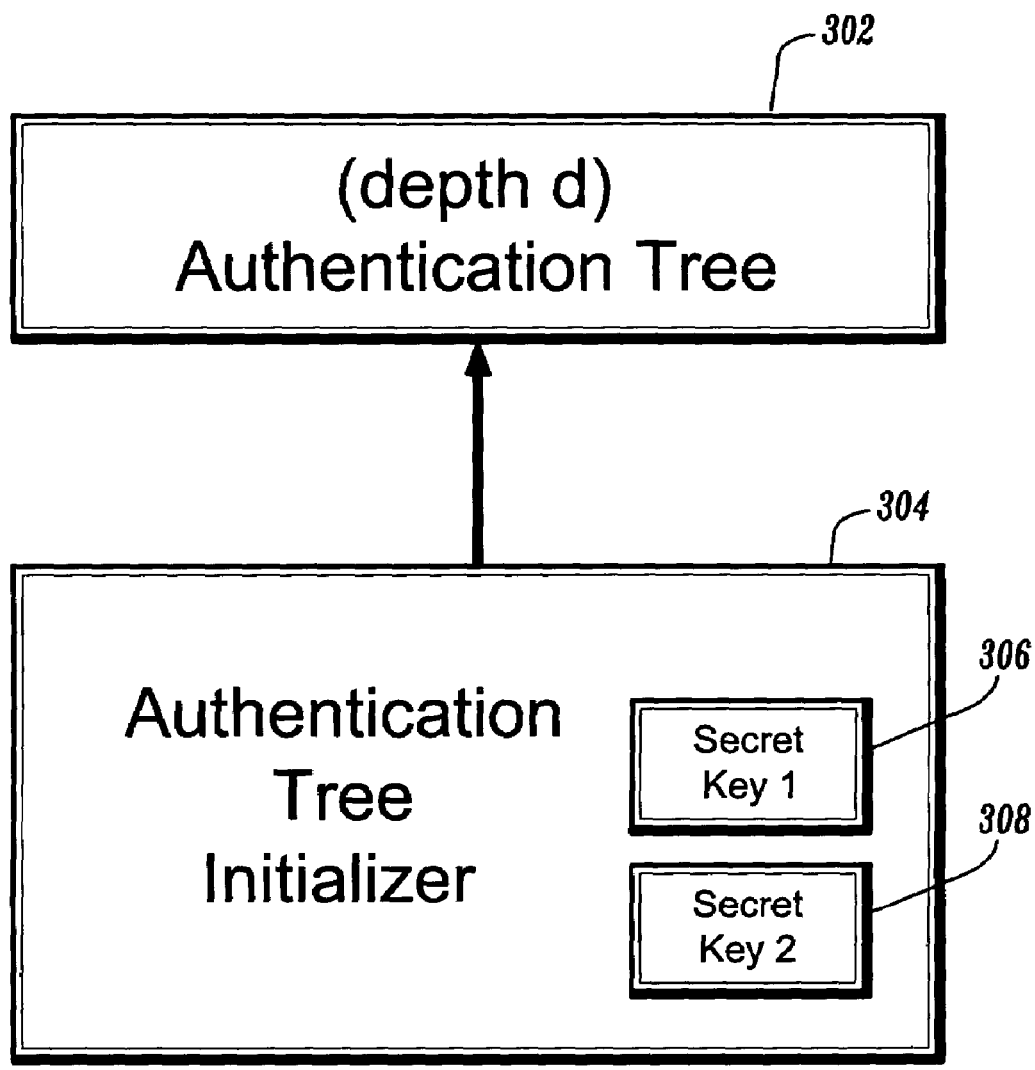
FIG. 3 is a flow diagram of an authentication tree initializer according to an embodiment of the present invention.

FIG. 3 illustrates a method according to an embodiment of the present invention depicting and authentication tree initializer having secret key-1 306 and secret key-2 308 initializing an authentication tree 302 having depth d. Depth d represents the number of layers of nodes within the authentication tree 302 from top to bottom. The authentication tree initializer 304 initializes the V-label and the E-label of each node using initial data. In a preferred embodiment of the present invention, the initial data is set to number zero. For example, the V-label can be initialized to number zero. The E-label can be initialized using a node index that has a value that depends on whether the node being initialized is a first child of a parent or a second child of a parent. If the node is the first child of a parent then the node index is set to number zero. If the node is the second child of a parent then the node index is set to number one.

A preferred embodiment of the present invention uses encryption with "whitening" (described below). Encryption with whitening uses two keys as input, called secret key-1 306, and secret key-2 308, and the depth d of the authentication tree 302. Whitening is followed by block cipher encryption using secret key-1. Secret key-1 306 is a secret key that can be used in block ciphers as described in FIG. 1. Secret key-2 308 is used for whitening and is about the same size, that is, the same number of bits, as secret key-1 306.

Whitening is accomplished by generating a random number using secret key-2 and combining the result with the initial data. A preferred embodiment for generating the random number is multiplication in a mathematical group of the secret key-2 and the node index. In a preferred embodiment of the present invention, combining the result of the random number generation and initial data is an exclusive OR operation.

According to another embodiment of the present invention, the mathematical group can be a finite Galois field using a prime number p, using arithmetic modulo p. In another embodiment of the present invention, the mathematical group can be a finite Galois field using irreducible polynomials. In another embodiment of the present invention, the mathematical group can be integer addition modulo a power of number 2. In another embodiment of the present invention, the authentication tree initializer can further require plaintext blocks as input. When encrypting plaintext blocks using encryption with whitening, an additional index is input into the process. The index is manipulated for whitening using the secret key-2 thereby producing whitening material. The whitening material is exclusive OR'd on a bit by bit basis with the plaintext. The result is then encrypted using secret key-1 as in the prior art.

In another embodiment according to the present invention the secret key-2 308 is derived from secret key-1 using a hash function.

Encryption with whitening is also discussed in U.S. patent application "Encryption Schemes with Almost Free Integrity Awareness", by C. S. Jutla, filed April, 2000 and in U.S. patent application "Improved Symmetric Key Authentication Encryption Schemes", by C. S. Jutla, filed November, 2000, both of which are incorporated by reference herein in their entirety.

Figure 4:
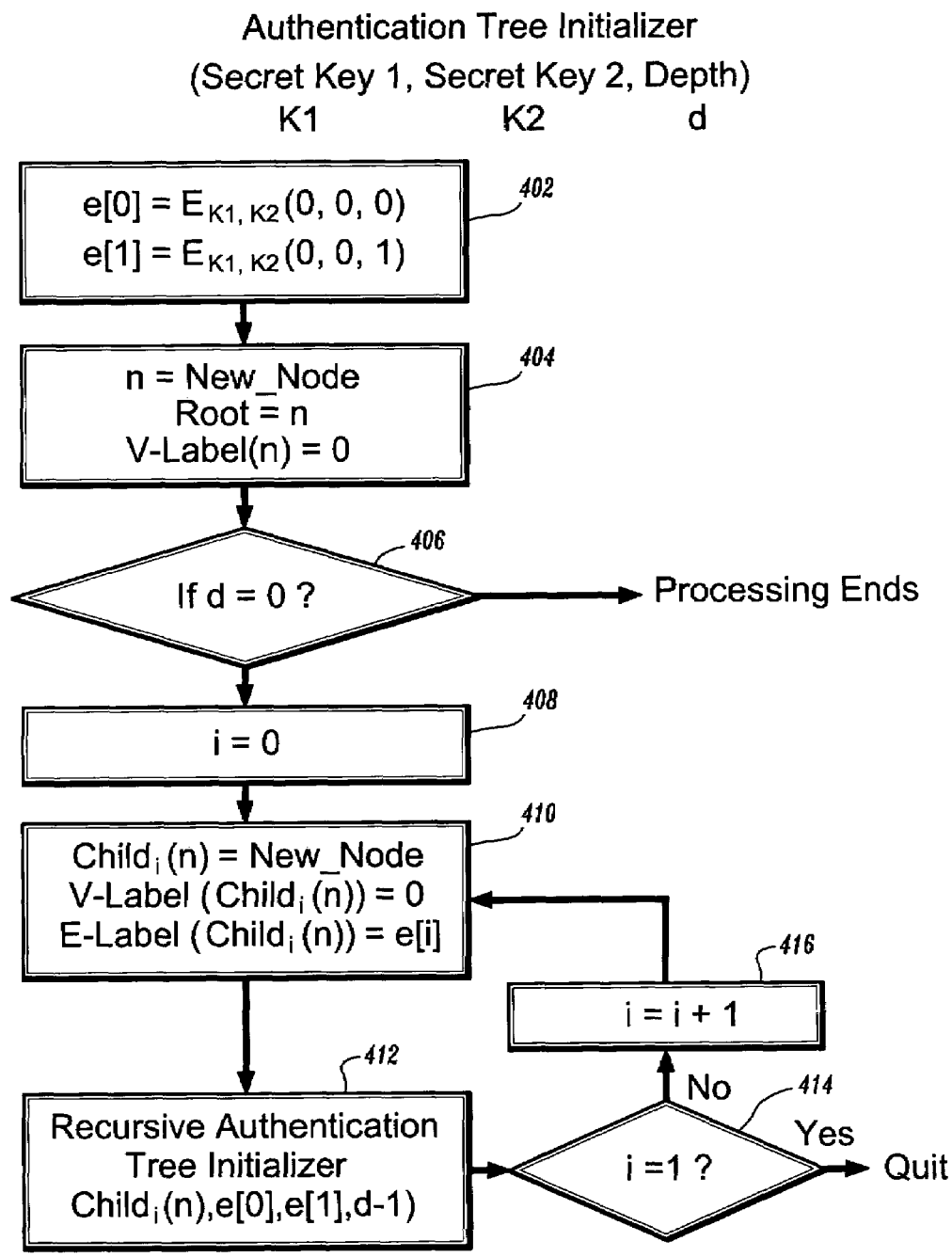
FIG. 4 is a flow diagram of a method of an authentication tree initializer according to an embodiment of the present invention.

FIG. 4 depicts an authentication tree initializer according to an embodiment of the present invention. Once the authentication tree is initialized, the initialized authentication tree is recursively used as input by the authentication tree initializer until all nodes have been processed.

The initialization begins by computing two initializing quantities e[0] and e[1](Step 402). After the two quantities e[0] and e[1] are computed, a new node is generated, which is called node n (Step 404). Node n is also the root node. The root node V-label is set to zero and the root node E-label is left undetermined as it will never be used (Step 404). Next, if the depth of the authentication, tree d is zero, the authentication tree initializer processing ends, returning the root node (Step 406), otherwise, i, which represents the number of the child node, is set to zero (Step 408). The i-th child of node n is set to a new node. The V-label of the new node is set to zero, and the E-label is set to previously computed e[i](Step 410). Recursive authentication initialization occurs, generating the subtree under this new node using the following arguments: the current node, e[0], e[1], and depth now set to d−1 (Step 412). Following the return of the recursive authentication initialization (Step 412), a check is made to determine if i=1 (Step 414). If i is equal to 1, processing ends, returning the authentication tree with root node r, and all the structure below it that was generated thus far. If i is not equal to 1, then i is incremented by 1 (Step 416). Processing continues by looping back to Step 410 until i is equal to 1.

Figure 5:
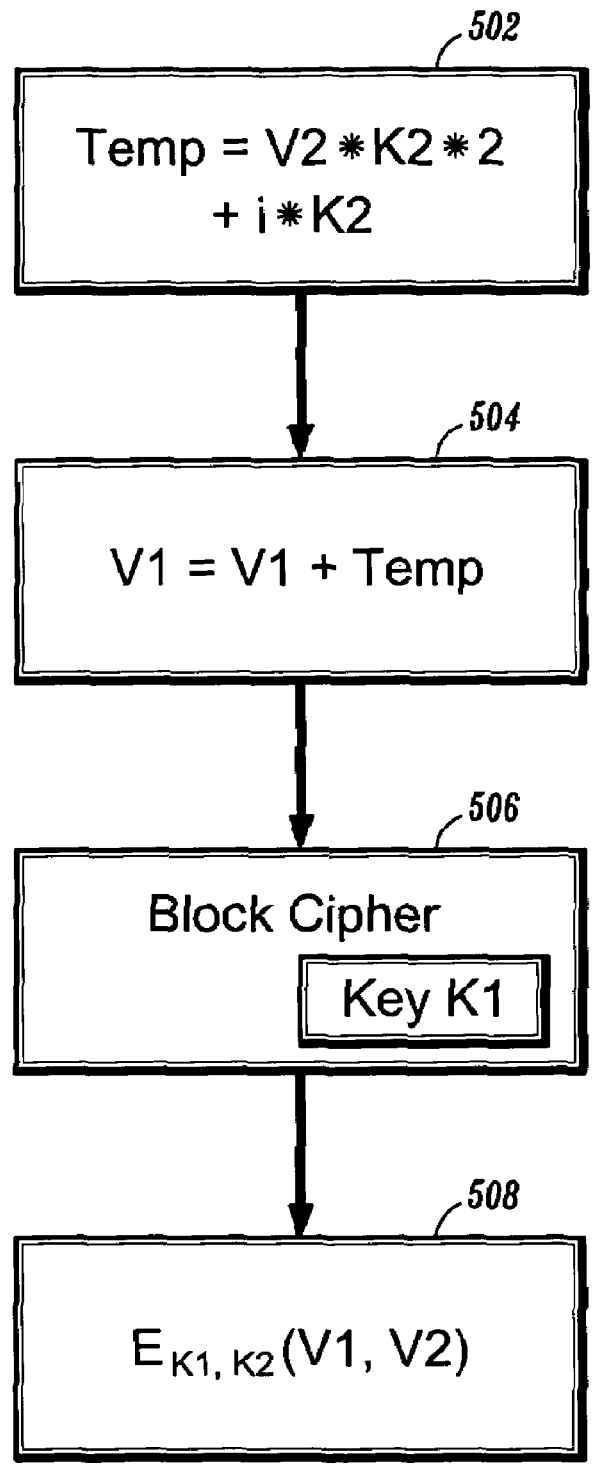
FIG. 5 is a flow diagram of a computation of quantities of a method of an authentication tree initializer according to an embodiment of the present invention.

The method in FIG. 5 is illustrative of an embodiment according to the present invention of the process of encryption with whitening. FIG. 5 depicts in detail how the initializing quantities e[0] and e[1] of Step 402 in FIG. 4, are computed. The quantity e[0] or e[1] is computed using a function E requiring three parameters: a value v1, a value v2, and a value i. The value v1 is the actual data to be encrypted. Value v1 and value v2 may be either the same number of bits as in a block of data, or a lesser number of bits as in a block of data. The value i is at least one bit and represents the arity of the tree. For example, for binary trees, the value i will be one bit, whereas for 8-ary trees, the value i will be three bits. The value i is appended as a bit or bits to the value v1. This composite value is viewed an an index and is used in the calculation of whitening material. A temp variable represents a whitening value. The temp variable is set equal to the value of v2 multiplied by key-2 further multiplied by 2 plus i times key-2 (Step 502). The new value v1 is set equal to the old value v1 plus the computed temp value (Step 504). Value v1 is encrypted after being whitened by applying the temp value. Encryption is performed by applying a block cipher is applied to the new value v1 (Step 506). The result from the block cipher yields the respective new value of either e[0] or e[1] (Step 508).

In another embodiment according to the present invention, the mathematical structure used for the computations of the temp value in the addition and multiplication operations, is a finite Galois field.

Galois fields are well known in the art of mathematics, computer science, and engineering. A finite Galois field can be, for example, a set of rational numbers with the exception that the number of entities in the Galois field is finite. For example, Galois field 2, has two entities 0 and 1. Addition is defined as 0 plus 0 is 0, 1 plus 0 is 1, and 1 plus 1 is 0. The multiplication process is the same as that used with integers. Generally, Galois fields are a set of entities with mathematical rules similar to the rules used with rational numbers, for example, addition, multiplication, inverses, and distributive properties. The addition used to compute the new value of v1 by adding the temp value to v1 is the bit by bit exclusive OR operation. In another embodiment of the present invention, the computations in the evaluation of function E are performed in a finite field.

In another embodiment of the present invention, the function E computations can be done in Galois field($2^n$), where ^ is an exponential function, and n is the number of bits in the data blocks.

In another embodiment of the present invention, the function E computations are performed in an arithmetic ring, for example, arithmetic modulo n bits.

In another embodiment of the present invention, value i is appended as a bit to the bit string representing v2. The result is then multiplied by secret key-2 in the given Galois field or arithmetic ring. The result of the multiplication is then added or exclusive -ORed with the given input v1. The result is then encrypted by a block cipher using secret key-1. The resulting ciphertext is the result of the function E.

Other embodiments according to the present invention can use a different addition mechanism.

Figure 6:
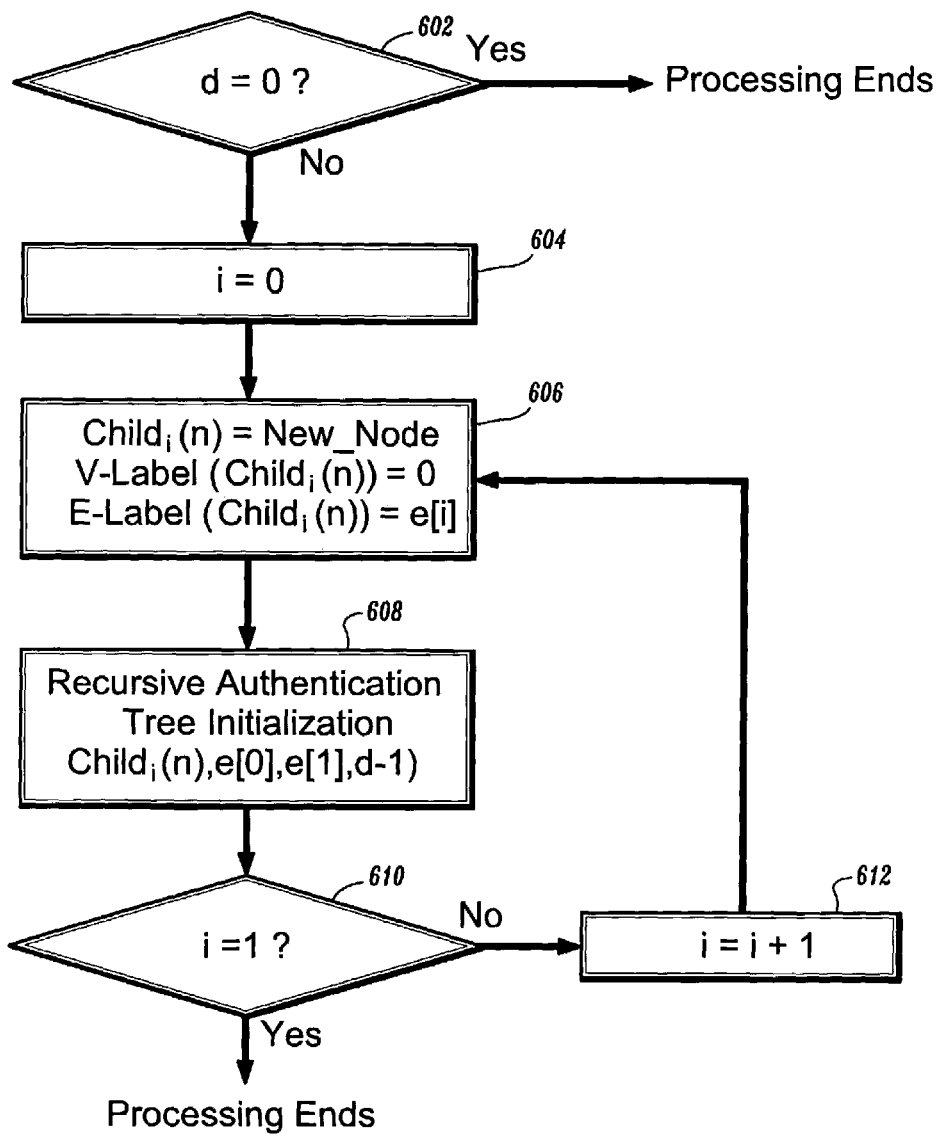
FIG. 6 is a flow diagram of a method of recursive authentication tree initializer according to an embodiment of the present invention.

FIG. 6 illustrates in detail the initialization of the authentication tree data structure as shown in step 412 of FIG. 4. In this embodiment of the present invention, the recursive authentication tree initializer, requires as input, a node n, two quantities e[0] and e[1] and a depth d. As previously stated, if the depth d of the authentication tree is zero (Step 602), processing ends, otherwise, i is set to zero (Step 604). The i-th child of node n is set to be a new node. The V-label of the new node is set to zero, and the E-label of the new node is set to e[i] (Step 606). Recursive authentication tree initialization is repeated with the arguments, the new node, e[0], e[1] and d−1 (Step 608). After the recursive authentication tree initialization returns, a check is made to determine if i is equal to 1. If i is equal to 1, processing ends (Step 610), otherwise, i is incremented by 1 (Step 612). Processing continues by looping back to Step 606 until i is equal to 1.

During the above initialization process a data structure is formed. The data structure has a root node and child nodes that are linked to the root node by pointers. If an authentication tree with depth d is used, the number of nodes in the authentication tree is two to the power of d. Each of the internal nodes and the root node can have two child nodes. These child nodes are accessed by child pointers in the data structure of each node. The V-label of each node is initialized to zero. The E-label of each node is set to quantity that is consistent with the overall rules of an authentication tree. These rules are now described.

At any stage during the entire encryption process, including after initialization of the authentication tree, the authentication tree data structure will satisfy the following consistency rules. After a leaf node index and its new V-label value have been provided, the authentication tree modifier modifies the authentication tree. First, the authentication tree modifier sets the V-label of all of the nodes on the path from the root node to the current leaf node to a new value. This new value for each node on the path, has to be unique, for example, never used before at any other internal node. An embodiment according to the present invention will increment a global number that is the root V-label. Once all of the V-labels of all nodes on the path are set, the E-labels of all the nodes on the path including the leaf node are recalculated. Also recalculated are the E-labels of the neighboring path. Thus, as illustrated in FIG. 2, the E-label of the updated set is changed. The consistency rule of the authentication tree requires that the E-label of a node be encrypted using secret key-1 of the whitened value of the V-label of that node. The whitening value to be used is computed using secret key-2 and the V-label of the parent of the current node combined with either 0 or 1 depending on whether the current node is the first child or the second child of the parent. This is done by appending the whitening value as bits. To ensure the consistency rule, the updated set of nodes undergo this update, that is, the recomputation of the E-labels, as these nodes have had the parent node's V-label renewed.

Figure 7:
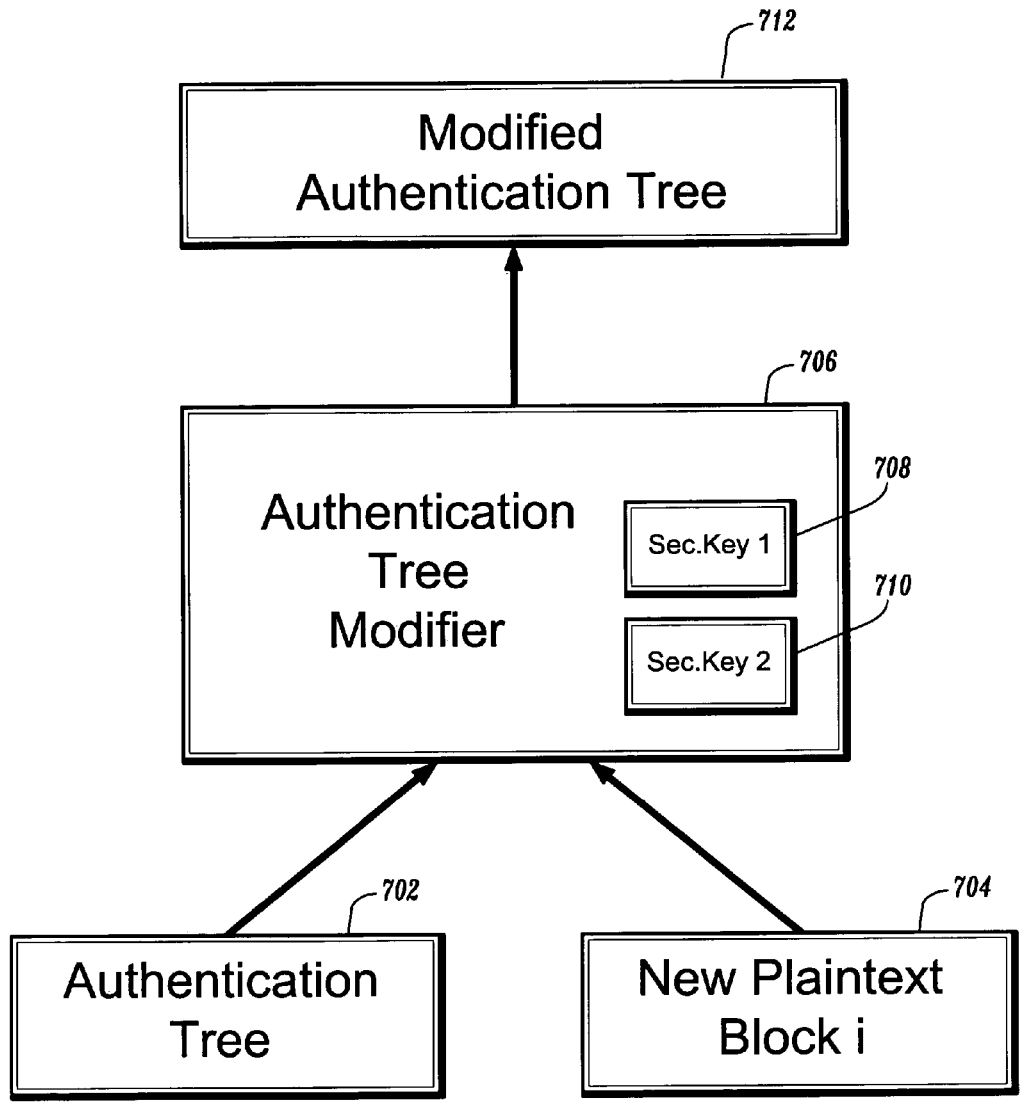
FIG. 7 is a flow diagram of a method of an authentication tree modifier according to an embodiment of the present invention.

FIG. 7 illustrates the modification that occurs to an authentication tree after an authentication tree 702 has been processed using recursive authentication tree initialization. The initialized authentication tree 702 now has a new structure. In a preferred embodiment of the present invention, a leaf node is required to be updated. The name or reference of the leaf node to be updated and the new V-label value of the leaf node are input into the authentication tree modifier 706. The authentication tree 702 and new plaintext data of the block i 704 of the authentication tree 702 are input to an authentication tree modifier 706. The authentication tree modifier has a secret key-1 708 and a secret key-2 710. The authentication tree modifier processes the authentication tree 702 and new plaintext data 704, to produce a modified authentication tree 712.

During the authentication tree modification processing, the the V-label and the E-label of a set of nodes of the initialized authentication tree, that have been previously updated by the authentication tree initializer, are modified. The updated set of nodes can include updated paths and neighboring nodes. In another embodiment according to the present invention, modifying the V-label and E-label of the updated set of nodes includes assigning new values to the V-label of each node in the updated path and modifying the E-label of each node in the updated path using secret key-1 708 and secret key-2 710. In another embodiment according to the present invention, assigning new values to the V-label includes assigning unique values to the V-label. In another embodiment according to the present invention, assigning new values to the V-label includes assigning values to the V-label using a random number generator. In another embodiment according to the present invention, assigning new values to the V-label includes assigning values in sequence to the V-label. In another embodiment according to the present invention, modifying the E-label using secret key-1 708 and secret key-2 710 includes using encryption with secret key-1 708 and secret key-2 710 on the V-Label of the current node and the V-label of the parent node of the current node and the child index of the current node. In another embodiment according to the present invention, encryption includes whitening followed by block cipher encryption using secret key-1 708. In another embodiment according to the present invention, whitening comprises generating a random number using secret key-2 710 and combining the result with the V-label of the node. In another embodiment according to the present invention, generating a random number uses multiplication in a mathematical group of secret key-2 710 and a vector obtained from the V-label of the parent node of the current node and the child index. In another embodiment according to the present invention, combining the result is an exclusive OR operation. In another embodiment according to the present invention, the mathematical group is a finite Galois field using a prime number. In another embodiment according to the present invention, the mathematical group is a finite Galois field using irreducible polynomials. In another embodiment according to the present invention, the mathematical group is integer addition modulo a power of number two. In another embodiment according to the present invention, the child index is number zero if the node is the first child of the parent. In another embodiment according to the present invention, the child index is number one if the node is the second child of the parent. In another embodiment according to the present invention, the vector is obtained by appending the child index to the V-label of the parent. In another embodiment according to the present invention, modification of nodes can include all nodes that are parent nodes of leaf nodes and of parent nodes that are already included in the path.

Figure 8:
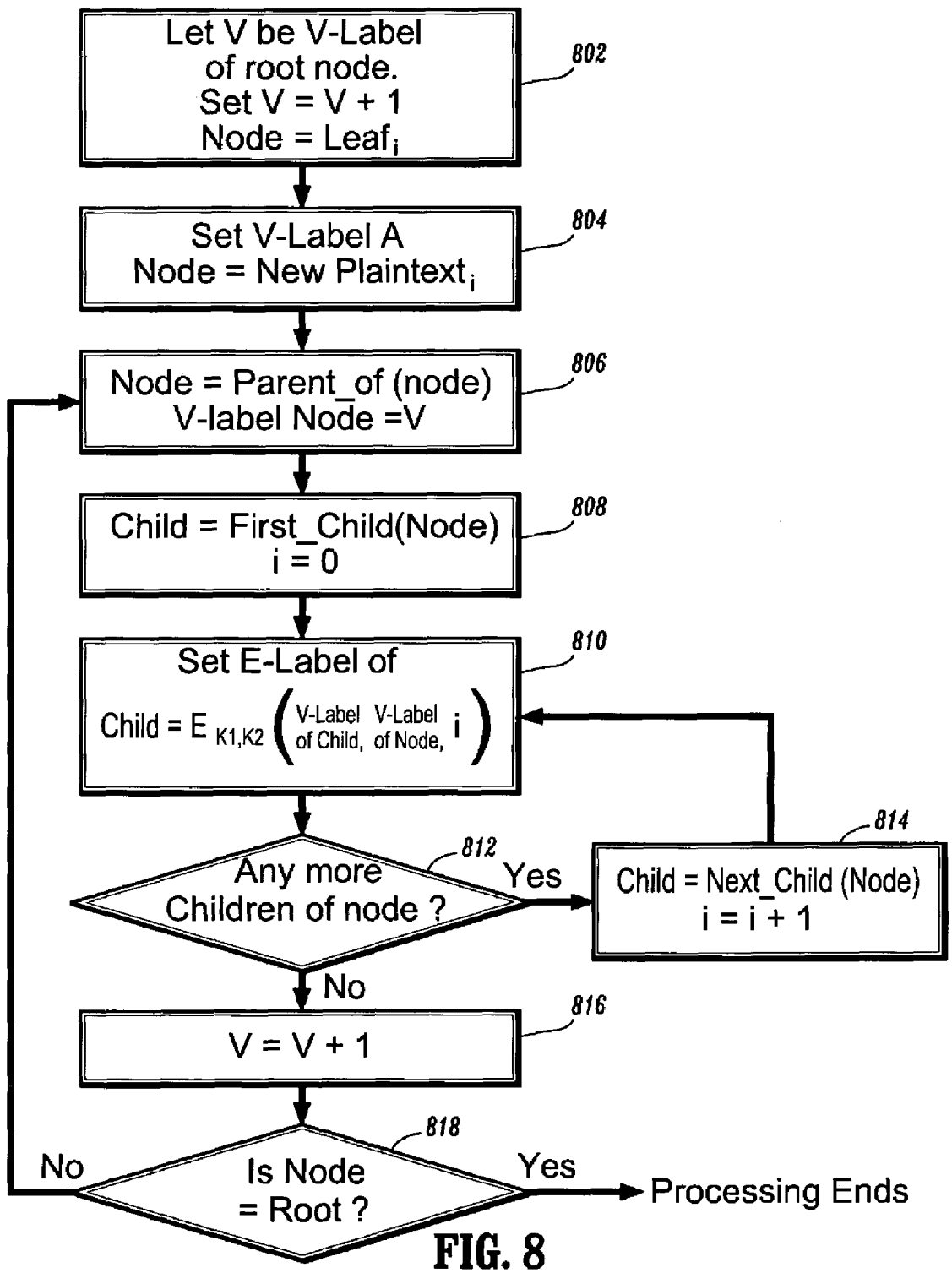
FIG. 8 is a flow diagram of a method of computation of a Function E of an authentication tree modifier according to an embodiment of the present invention.

FIG. 8 describes in further detail an embodiment of the authentication tree modifier 706 of FIG. 7 according to an embodiment of the present invention. The V-label of the root node is v and is incremented by 1 (Step 802). The current node is set to the i-th leaf node of the tree (corresponding to the ith block being updated)(Step 802). The V-label of the current node is set to the new plaintext data of the block i provided as input (Step 804). The current node is updated and becomes the parent of the current node and the V-label of the current node is set to v (Step 806). The child node is set to be the first child of the current node and i is set to zero (Step 808). Using the parameters: V-label of the child node, V-label of the current node and i, compute the function E (described in detail below) under keys K1, and K2, then set the E-label of the child node to the computed value (Step 810). Test to determine if there are any more child nodes of he current node (Step 812). If there are more child nodes of the current node, set the child node to be the next child of the current node (Step 814). Processing continues by looping back to Step 810 until there are no more child nodes remaining to be processed in the current node. Once there are no more child nodes remaining to be processed in the current node, v is incremented by 1 (Step 816). If the current node is the root node, the update of the authentication tree is complete, processing ends and the current node, which is the root node, is returned (Step 818). If the current node is not the root node (Step 818), set the current node to be the parent of the current node, and continue processing by looping back to Step 806. Step 810 of FIG. 8 illustrates a computation for the function E, according to an embodiment of the present invention. The function E requires two keys K1 and K2. According to another embodiment of the present invention, one key can be derived from the other key by any means known in the art, for example, pseudorandom expansion.

The teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more Central Processing Units ("CPUs"), a Random Access Memory "RAM"), and Input/Output ("I/O") interfaces. The computer platform may also include an operating system and −+ micro instruction code. The various processes and functions described herein may be either part of the micro instruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for implementing a parallelizable authentication tree comprising the steps of:
   initializing an authentication tree using a first secret key and a second secret key to include at least one of a plurality of nodes;
   inputting a plaintext block into an authentication tree modifier for encryption with whitening;
   inputting said initialized authentication tree into said authentication tree modifier for encryption with whitening;
   processing said plaintext block and said initialized authentication tree by said authentication tree modifier using said first secret key for block cipher encryption and said second secret key for whitening; and
   outputting a modified authentication tree from said authentication tree modifier, wherein said modified authentication tree is substituted for said initialized authentication tree and recursively used as input into said authentication tree modifier for said processing step, said modified authentication tree including a ciphertext corresponding to the plaintext block.

2. The method of claim 1, wherein said nodes are one of an internal node and a leaf node.

3. The method of claim 2, wherein one internal node is a root node.

4. The method of claim 2, wherein said nodes each have a first label having a unique value among first labels in the authentication tree and a second label having a value that depends on whether a node is a first child of a parent or a second child of the parent.

5. The method of claim 1, wherein said internal nodes comprise at least one of a plurality of child node pointers.

6. The method of claim 5, wherein said child node pointer of each node makes said each node a parent node of a child node to which said child node pointer points.

7. The method of claim 4, wherein said step of initializing an authentication tree includes initializing said first label and said second label of said nodes.

8. The method of claim 7, wherein said first label is initialized to zero.

9. The method of claim 7, wherein said second label is initialized to a computed value using a node index that is dependent on whether said node is a first child node or a second child node.

10. The method of claim 9, wherein said computed value includes using initial data.

11. The method of claim 10, wherein said initial data is zero.

12. The method of claim 11, wherein said computed value includes using encryption with said first secret key and said second secret key.

13. The method of claim 12, wherein said using encryption includes whitening using said second secret key followed by block cipher encryption using said first secret key.

14. The method of claim 13, wherein said whitening includes generating a random number using said second secret key and combining said random number with said initial data.

15. The method of claim 13, wherein said whitening includes generating a random number by multiplication in a mathematical group of said second secret key and said node index.

16. The method of claim 14, wherein said combining is an exclusive OR operation.

17. The method of claim 7, wherein said initialization is performed recursively.

18. The method of claim 1, wherein the step of initialization requires inputting plaintext blocks.

19. The method of claim 15, wherein said mathematical group is a finite Galois field using a prime number.

20. The method of claim 15, wherein said mathematical group is a finite Galois field using irreducible polynomials.

21. The method of claim 15, wherein said mathematical group is integer addition modulo a power of number two.

22. The method of claim 9, wherein said node index is number zero if said node is said first child node.

23. The method of claim 9, wherein said node index is number one if said node is said second child node.

24. The method of claim 2, wherein said processing said plaintext block and said initialized authentication tree includes inputting a leaf node.

25. The method of claim 4, wherein said processing said plaintext block and said initialized authentication tree includes modifying said first label and said second label of each node in an updated set of nodes.

26. The method of claim 25, wherein the updated set of nodes includes a path and a neighboring path.

27. The method of claim 26, wherein said path includes all nodes on said path from said root node to said leaf node.

28. The method of claim 27, wherein said neighboring nodes includes all nodes which are child nodes of the nodes in said path.

29. The method of claim 27, wherein said path includes all nodes which are parent nodes of said internal and said leaf nodes.

30. The method of claim 25, wherein said step of modifying said first label and said second label of each node in an updated set of nodes includes assigning new values to said first label of each node in said updated set of nodes and modifying said second label of each node in said updated set of nodes using said first secret key and said second secret key.

31. The method of claim 30, wherein said assigning new values includes assigning unique values.

32. The method of claim 30, wherein said assigning new values includes assigning values using a random number generator.

33. The method of claim 30, wherein said assigning new values includes assigning values in sequence.

34. The method of claim 30, wherein said modifying said second label includes using encryption with said first secret key and said second secret key of said first label of said node and said first label of the parent of said node and said child index of said node.

35. The method of claim 34, wherein said encryption includes whitening followed by block cipher encryption using said first secret key.

36. The method of claim 35, wherein said whitening includes generating a random number using said second secret key and combining the random number with said first label of said node.

37. The method of claim 36, wherein said generating a random number includes multiplication in a mathematical group of said second secret key and a vector obtained from said first label of said parent node and said child index.

38. The method of claim 36, wherein said mathematical group is finite Galois field using a prime number.

39. The method of claim 36, wherein said mathematical group is finite Galois field using irreducible polynomials.

40. The method of claim 36, wherein said mathematical group is integer addition modulo a power of number two.

41. The method of claim 34, wherein said child index is number zero if said node is said first child of a parent.

42. The method of claim 34, wherein said child index is number one if said node is said second child of a parent.

43. The method of claim 34, wherein said vector is obtained by appending said child index to said first label of said parent node.

44. The method of claim 1, wherein said second key is derived from said first key by a cryptographic operation.

45. The method of claim 7, wherein said second label is initialized to a value obtained by block encryption using said first key set to number zero.

46. The method of claim 30, wherein said step of modifying said first label and said second label of each node in an updated set of nodes depends on whether said node in an updated set of nodes is a first child or a second child of its parent node.

47. The method of claim 46, wherein said first label has a size half of said block encryption size.

48. The method of claim 47, wherein said modifying said second label of said second child node is redundant.

49. The method of claim 47, wherein said modifying said second label of said first child node includes using encryption with said first secret key and said second secret key of said first label of said node and said first label of said parent of said node and said first label of a second child of said parent.

50. The method of claim 49, wherein encryption includes whitening using said second secret key followed by block cipher encryption using said first secret key.

51. The method of claim 50, wherein said whitening includes generating a random number using said second secret key and combining said random number with said first label of said node and said first label of said second child of said parent node of said node.

52. The method of claim 51, wherein said generating a random number includes multiplication in a mathematical group of said second secret key and said first label of said parent node.

53. The method of claim 52, wherein said mathematical group is a finite Galois field using a prime number.

54. The method of claim 52, wherein said mathematical group is a finite Galois field using irreducible polynomials.

55. The method of claim 52, wherein said mathematical group is integer addition modulo a power of number two.

56. The method of claim 51, wherein said combining is obtained by concentrating said first label of said node and said first label of said second child of said parent node of said node and performing an exclusive OR operation on said concatenated value and said random number.

57. A program storage device readable by machine, tangibly embodying a program of instructions executable by the machine to perform method steps for implementing a parallelizable authentication tree, the method steps comprising:

initializing an authentication tree using a first secret key and a second secret key to include at least one of a plurality of nodes;

inputting a plaintext block into an authentication tree modifier for encryption with whitening;

inputting said initialized authentication tree into said authentication tree modifier for encryption with whitening;

processing said plaintext block and said initialized authentication tree by said authentication tree modifier using said first secret key for block cipher encryption and said second secret key for whitening; and outputting a modified authentication tree from said authentication tree modifier, wherein said modified authentication tree is substituted for said initialized authentication tree and recursively used as input into said authentication tree modifier for said processing step, said modified authentication tree including a ciphertext corresponding to the plaintext block.

* * * * *